United States Patent Office 2,717,894
Patented Sept. 13, 1955

2,717,894
SULFURIC ESTERS OF ACYLATED GLUCAMINES

Anthony M. Schwartz, Washington, D. C., assignor to Commercial Solvents Corporation, Terre Haute, Ind., a corporation of Maryland No Drawing. Application May 19, 1951,
Serial No. 227,281

5 Claims. (Cl. 260—211)

My invention relates to a new group of chemical compounds. More particularly, it relates to sulfuric esters of acylated glucamine and N-alkylglucamines and to a method for their preparation.

Compounds falling within the scope of my invention include all those having the structural formula:

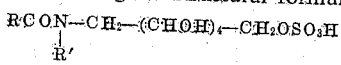

wherein R' represents a member selected from the group consisting of hydrogen and alkyl radicals having from 1 to 6 carbon atoms inclusive; and R represents the hydrophobic residue of a carboxylic acid having 8 to 30 carbon atoms inclusive. Specific examples of radicals of the type covered in the definition of R include the straight chain saturated alkyl radicals from $C_7H_{15}$ to $C_{17}H_{35}$ and the straight chain olefinic radical $C_{17}H_{33}$, as well as radicals from other carboxylic acids having surface active properties such as, for example, rosin acids, alkylbenzoic acids, alkylphenoxyacetic acids, naphthenic acid, hydroxylated long chain fatty acids such as ricinoleic acids, etc. Specific examples of R' include methyl, ethyl, isopropyl, butyl, etc.

Also included in my invention are the alkali metal, alkaline earth metal, and ammonium salts of the above described sulfuric esters.

The starting materials for the preparation of the products of the present invention are acylated glucamine and N-alkylglucamines having the formula:

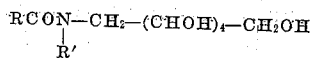

wherein R and R' have the values defined above. These acylated glucamine compounds can be prepared by condensing a suitable acid with glucamine or an N-alkylglucamine in accordance with the method described in U. S. Patent No. 1,985,424 issued to Henry Alfred Piggott, or by condensing an aliphatic ester of an acid with the glucamine or N-alkylglucamine as described in my copending application, U. S. Serial No. 164,286, filed May 25, 1950, now U. S. Patent 2,703,798.

The amides described above are treated with a sulfating agent to produce the sulfated amides of my invention. The sulfation may be carried out by any of the several methods known to the art. The sulfating agents and conditions may be chosen according to known precepts to give optimum yields of the desired products. These conditions will vary according to the particular acylated glucamine to be sulfated. Among the sulfating agents which I have found to be effective in producing the products of my invention are sulfuric acid, sulfuric acid with urea, oleum, chlorosulfonic acid, and sulfur trioxide. Where the hydrophobic radical contains a sulfatable or sulfonatable grouping, as in the case of oleic, recinoleic or alkoxyacetic derivatives, it is advantageous to use a sulfating agent, such as sulfamic acid, which is specific for primary hydroxyl groups. However, in general I prefer to carry out the sulfation with cholorosulfonic acid. In accordance with this method the amide is first dissolved in a solvent to homogenize the final mixture and to avoid an excessively violent reaction. The solution is then cooled to about 30° C. and chlorosulfonic acid added slowly and with vigorous agitation. The primary product under these conditions is the monosulfate of the amide and the sulfation takes place almost exclusively on the primary hydroxyl group. It is, however, difficult to avoid the formation of some product in which two sulfuric ester groups are present, one on the terminal primary hydroxyl group of the glucose residue, as desired, and another on one of the secondary hydroxyl groups. In addition to products of this nature there will sometimes be present in the final reaction mixture minor amounts of unsulfated starting material. These products will, in the quantities normally present, have little effect on the properties of the main product. The sulfated mixture thus obtained can be converted to the alkali metal, alkaline earth metal, or ammonium salt by neutralizing with the appropriate base and removing the solvent.

The preparation of the products of my invention is further illustrated by the following specific examples.

EXAMPLE I

Twenty-three and one-half grams (.05 mole) of oleic N-methylglucamide was dissolved in 75 ml. of diethyl Cellosolve and the solution cooled to about 30° C. To this solution was added 4 to 5 ml. (.06 to .07 mole) of chlorosulfonic acid, dropwise and with vigorous agitation. The time of addition was about 10 minutes and the temperature rose to about 45–50° C. The product was isolated by neutralizing with sodium hydroxide and sodium carbonate and separating the solvent by distillation. The excess inorganic salt was removed by extracting the dried product with hot ethyl alcohol, in which the sulfated fatty acyl glucamides are soluble. The inorganic salt is not soluble in the hot ethyl alcohol and was removed by filtration. On evaporating the alcohol from the filtrate, the product was obtained.

Following the procedure given above sulfation of the following amides has been effected:

Lauric N-methylglucamide
Stearic N-methylglucamide
Palmitic N-methylglucamide
Palmitic glucamide The lime soap dispersion values for each of the above sulfated amides was obtained by the following procedure. One percent distilled water solutions were made up of soap and of the sample to be tested. These were mixed in varying proportions, e. g. 20% sample being tested to 80% soap; 10% sample to 90% soap; 6% sample to 94% soap, etc. Five ml. of each mixture was diluted with 45 ml. of 400 p. p. m. hard water in a Nessler tube and was then allowed to stand 30 minutes. The mixture of lowest sample-to-soap ratio which does not form visible agglomerates of lime soap under these conditions represents the lime soap dispersion value. Using this procedure, each of the sulfated glucamides prepared as described above gave lime soap dispersion values as low as 0.04. Unsulfated oleic N-methylglucamide has a lime soap dispersion value of 0.6, measured by the above method, while palmitic N-methylglucamide has a value of 0.25, lower than any other unsulfated glucamide.

EXAMPLE II

One mole of the N-methylglucamide of oleic acid and 1.1 moles of sulfamic acid were heated together for 45 minutes at 150–160° C. The pasty homogeneous product which resulted was worked up by dissolving in twice its weight of water, adding 0.6 mole of sodium carbonate and heating until the ammonia was substantially removed. The product was then drum dried to form slightly adherent flakes.

EXAMPLE III

The procedure of Example II was repeated with stearic N-methylglucamide. The sodium salt was prepared in the same manner as described in Example I and the product also drum dried.

The products from both Example II and Example III gave clear aqueous solutions of high lime resistance and much better foaming power than the original unsulfated materials. The detergent characteristics of the sodium salts of these products in tap water and in hard water are shown in Tables A and B, below. The detergency test to which these specific compounds were subjected is widely used and well recognized by technologists who have specialized in this field. It consists in washing swatches of standard soiled fabrics under controlled conditions with a standard aqueous solution of the detergent in a Launder-O-Meter instrument, and estimating the degree of soil removal by means of a photometer. In these tests a 20 minute washing interval was used for the cotton swatches and a 10 minute interval was used for the wool. All detergency tests were conducted at 50° C. In the tables, the products are identified by the materials from which they were prepared, thus oleic-MGL stands for oleic N-methylglucamide.

Table A

| Detergent | Concentration, Percent Active in Tap Water (100 p. p. m.) | Soil Removal Efficiency, Percent | | Appearance of Solutions | Foam After Washing |
|---|---|---|---|---|---|
| | | Cotton | Wool | | |
| Oleic-MGL | 0.05 | 7 | 46 | Turbid | Slight. |
| Do | 0.1 | 11 | 49 | do | Do. |
| Sulfated Oleic-MGL | 0.05 | 14 | 48 | Clear | Good. |
| Do | 0.1 | 16 | 51 | do | Do. |
| Stearic-MGL | 0.05 | 3 | 31 | Turbid | None. |
| Do | 0.1 | 3 | 40 | do | Do. |
| Sulfated Stearic-MGL | 0.05 | 8 | 34 | Slightly Turbid | Slight. |
| Do | 0.1 | 7 | 36 | do | Do. |

Table B

| Detergent | Concentration, Percent Active in Hard Water (400 p. p. m.) | Soil Removal Efficiency, Percent | |
|---|---|---|---|
| | | Cotton | Wool |
| Oleic-MGL | 0.05 | 7 | 29 |
| Do | 0.1 | 11 | 42 |
| Sulfated Oleic-MGL | 0.05 | 16 | 46 |
| Do | 0.1 | 18 | 53 |
| Stearic-MGL | 0.05 | 5 | 23 |
| Do | 0.1 | 6 | 27 |
| Sulfated Stearic-MGL | 0.05 | 12 | 38 |
| Do | 0.1 | 14 | 36 |

It is apparent from the foregoing tables that the cotton detergency of both products is greatly improved by sulfation, with the effect being more pronounced in hard water than in tap water. Significant improvement in the wool detergency is shown only in hard water. This is not surprising since the wool detergency of the original materials is already quite high.

EXAMPLE IV

Following the procedure of Example II the following amides have been successfully sulfated by the use of chlorosulfonic acid:

N-isopropylglucamide of cocoanut fatty acids
N-isopropylglucamide of oleic acid
Glucamide of cocoanut fatty acids
N-methylglucamide of lauric acid
N-ethylglucamide of palmitic acid
N-methylglucamide of myristic acid Tests with the products produced by sulfation of the above amides showed that sulfation improves the solubility, foaming and detergency of the products, especially in hard water. The alkaline earth metal, alkali metal and ammonium salts of these sulfated amides showed outstanding lime soap dispersing properties.

EXAMPLE V

One mole of the N-methylglucamide of stearic acid was dissolved into ten moles of 95% sulfuric acid and warmed for about 30 minutes to 70–80° C. The mixture was cooled and neutralized with ice and caustic soda. It was then drum dried, forming a fluffy light tan powder containing approximately 30% of the detergent product and 70% of sodium sulfate. Detergency tests showed that this sulfated product possessed greatly improved cotton detergency and that the wool detergency was not significantly different from the unsulfated material.

EXAMPLE VI

One mole of the N-methylglucamide of oleic acid was heated to 70–90° C. for 30 minutes with five moles of 95% sulfuric acid to which had been added 20% urea. The sulfating mixture then contained 100 parts 95% sulfuric acid and 20 parts urea. The sulfated product was then cooled and neutralized with ice and caustic soda, to form the sodium salt. Detergency tests also showed that sulfation by this method improved the cotton detergency.

I claim:

1. A composition selected from the group consisting of a compound having the formula:

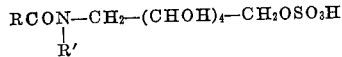

wherein R' represents a member selected from the group consisting of hydrogen and alkyl radicals having from 1 to 6 carbon atoms inclusive and R represents the hydrophobic residue of a carboxylic acid having 8 to 30 carbon atoms inclusive, and the alkali metal, alkaline earth metal and ammonium salts of the said compounds.

2. A compound selected from the group consisting of the sulfuric ester of the N-methylglucamide of oleic acid and the alkali metal, alkaline earth metal and ammonium salts of said ester.

3. A compound selected from the group consisting of the sulfuric ester of the N-glucamide of stearic acid and the alkali metal, alkaline earth metal and ammonium salts of said ester.

4. A compound selected from the group consisting of the sulfuric ester of the N-methylglucamide of palmitic acid and alkali metal, alkaline earth metal, and ammonium salts of said ester.

5. A compound selected from the group consisting of the sulfuric ester of the glucamide of cocoanut fatty acids and the alkali metal, alkaline earth metal and ammonium salts of said ester.

References Cited in the file of this patent

UNITED STATES PATENTS

| 1,985,424 | Piggott | Dec. 25, 1934 |
| 2,002,613 | Orthner | May 28, 1935 |
| 2,091,105 | Piggott | Aug. 24, 1937 |
| 2,212,521 | Harris | Aug. 27, 1940 |
| 2,604,467 | Crouch et al. | July 22, 1952 |